United States Patent [19]
Ward

[11] Patent Number: 5,367,750
[45] Date of Patent: Nov. 29, 1994

[54] WIRING HARNESS CLIP

[76] Inventor: Mark C. Ward, 1061 Troon, St. Clair, Mich. 48079

[21] Appl. No.: 158,641

[22] Filed: Nov. 26, 1993

[51] Int. Cl.⁵ .......................... B65D 63/00; F16L 3/00
[52] U.S. Cl. ............................... 24/16 PB; 24/17 AP; 24/543; 248/74.3
[58] Field of Search ........... 24/16 PB, 17 AP, 30.5 P; 248/71, 74.2, 74.3

[56] References Cited

U.S. PATENT DOCUMENTS

| | | | |
|---|---|---|---|
| 3,090,826 | 5/1963 | Cochran | 248/74.3 |
| 3,163,712 | 12/1964 | Cochran | 248/71 |
| 3,980,263 | 9/1976 | Okuda | 248/74.3 |
| 4,371,137 | 2/1983 | Ancher | 24/16 PB |
| 4,762,296 | 8/1988 | Kraus et al. | 24/543 |
| 4,917,340 | 4/1990 | Juemann et al. | 248/74.2 |

*Primary Examiner*—Victor N. Sakran
*Attorney, Agent, or Firm*—Peter D. Keefe

[57] ABSTRACT

A clip which secures wiring to a base structure, composed of a head for holding the wiring and a stanchion for connecting the head with a base structure. The head is provided with an upper portion and hingably connected lower portion. The lower portion is provided with a wiring seat, a flexible retention arm and a first toothed surface member. The upper portion is provided with a flexible biasing arm, an abutment arm and a second toothed surface member. A retainer arm is connected with the lower portion of the head for preventing unintentional disengagement of the first and second toothed members. In operation, the upper portion is pivoted on the hinge toward the lower portion, during this movement, the first and second toothed surface members will mutually engage in a ratchet-like manner, while the retention arm is pressed against the wiring by abutting action of the biasing arm. Depending on the wiring diameter the abutment arm may abuttably engage the wiring. The final disposition of the upper portion with respect to the lower portion will secure the wiring to the head. To remove the wiring from the clip, the upper toothed member is twisted slidably with respect to the second toothed member to terminate mutual engagement so that the upper portion may be pivoted away from the lower portion.

10 Claims, 2 Drawing Sheets

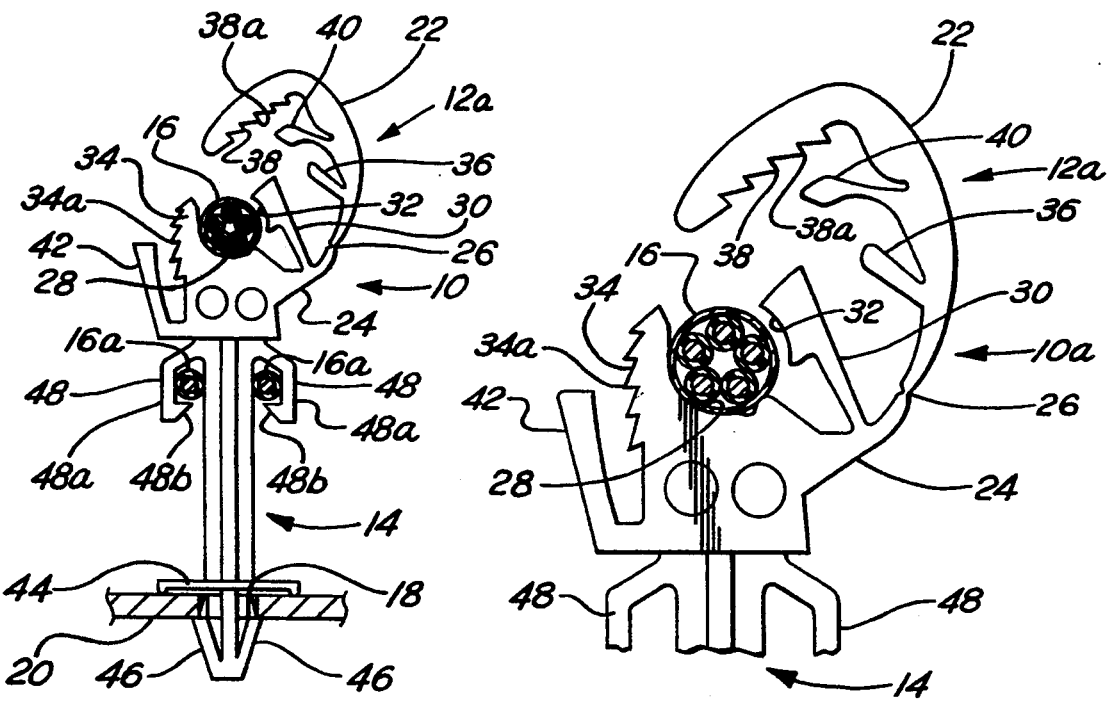
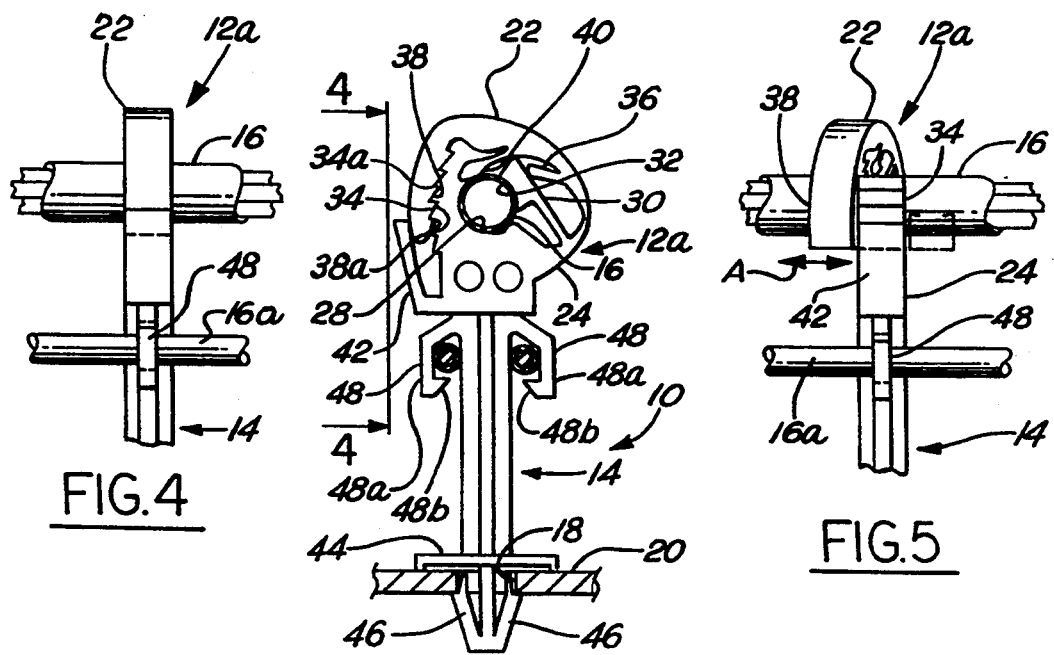
FIG. 1  FIG. 2  FIG. 4  FIG. 3  FIG. 5

WIRING HARNESS CLIP

BACKGROUND OF THE INVENTION

1. Field of the Invention

The present invention relates to retention devices for holding wiring in a predetermined location with respect to a base structure, and more particularly to a clip having undue locking and releasing features with respect to wiring that is held in position thereby.

2. Description of the Relevant Art

In order that wiring run from a first location to a second location along a predetermined path and not migrate off the path, the wiring is fastened to a base structure between the first and second locations. In this regard, it is conventional practice to utilize retention devices in the form of ties which connect between the base structure and the wiring to thereby locate the wiring with respect to the base structure at periodic locations along the preselected path of the wiring.

While ties well serve the purpose of securing the wiring to the base structure, they have certain disadvantages. For example, ties using a racheting closure mechanism are generally not releasable from the wiring; consequently, they are not reusable. In this case, the tie must be cut in order to free the wiring from the tie if it is ever necessary to relocate, service or replace the wiring. Twist ties generally do not have a long service life and can easily fail. Further, ties generally secure the wiring directly to the base structure which can lead to wiring damage as the wiring squirms in relation to the base structure as a result of normal movements and vibrations of the base structure during use.

Accordingly, what remains needed in the art is a clip which reliably secures wiring with respect to a base structure, while providing for selective release of the wiring from the clip so that the clip may be reused. Further, what remains needed in the art is a clip of the aforementioned type which provides for location of the wiring at a predetermined spacing from the base structure and which minimizes wear of the wiring.

SUMMARY OF THE INVENTION

The present invention is a clip which reliably secures wiring with respect to a base structure, while providing for selective release of the wiring from the clip so that the clip may be reused. Further, the present invention provides for location of the wiring at a predetermined spacing from the base structure and minimizes wiring wear.

The clip according to the present invention is composed generally of a head for holding wiring and a stanchion for connecting with a base structure. The head is provided with an upper portion and a lower portion, wherein the lower portion is connected with the stanchion and the upper and lower portions are mutually connected by a living hinge. The lower portion is provided with a wiring seat, a flexible retention arm and a first toothed surface member. The upper portion is provided with a flexible biasing arm, an abutment arm and a second toothed surface member. Preferably, a retainer arm is connected with the lower portion of the head for preventing unintentional disengagement of the first and second toothed members.

In operation, the stanchion is placed into an aperture in the base structure, then the upper portion of the head is pivoted on the living hinge with respect to the lower portion of the head to allow the wiring to be placed upon the wiring seat. Now, the upper portion is pivoted toward the lower portion. During this movement, the first and second toothed surface members will mutually engage in a ratchet-like manner, while the retention arm is pressed against the wiring by abutting action of the biasing arm. Depending on the wiring diameter the abutment arm may abuttably engage the wiring. The final disposition of the upper portion with respect to the lower portion will secure the wiring to the head.

In order to remove the wiring from the clip, all that need be done is to transversely twist the upper toothed member slidably with respect to the second toothed member, whereupon when mutual engagement is terminated and the upper portion may then be pivoted away from the lower portion.

Preferably, one or more auxiliary wiring holders are provided for holding auxiliary wiring. The auxiliary wiring holders are preferably connected with the stanchion adjacent the lower portion of the head.

Accordingly, it is an object of the present invention to provide a clip which holds wiring in a secure, yet selectively releasable manner.

It is an additional object of the present invention to provide a clip which holds wiring with little or no wear at a predetermined distance with respect to a base structure.

It is yet another object of the present invention to provide a clip which holds wiring securely thereto, but which permits the wiring to be nondestructively released therefrom, wherein the wiring is held at a predetermined distance with respect to a base structure, and further wherein both the securing and the releasing of the wiring with respect thereto are easily and simply accomplished.

These, and additional objects, advantages, features and benefits of the present invention will become apparent from the following specification.

BRIEF DESCRIPTION OF THE DRAWINGS

FIG. 1 is a partly sectional side view of a first preferred embodiment of the clip according to the present invention, shown in operation with respect to wiring, auxiliary wiring and a base structure.

FIG. 2 is a partly sectional detail side view of the head of the clip depicted in FIG. 1, shown in an open configuration.

FIG. 3 is a partly sectional side view of the first preferred embodiment of the clip depicted in FIG. 1, now showing the head in a closed configuration.

FIG. 4 is an end view of the clip and the aforementioned wiring and auxiliary wiring, seen along line 4—4 in FIG. 3.

FIG. 5 is an end view of the clip as in FIG. 4, now showing the upper toothed member being transversely twisted slidably with respect to the lower toothed member for releasing the wiring from the clip.

DETAILED DESCRIPTION OF THE PREFERRED EMBODIMENTS

Figure 6:
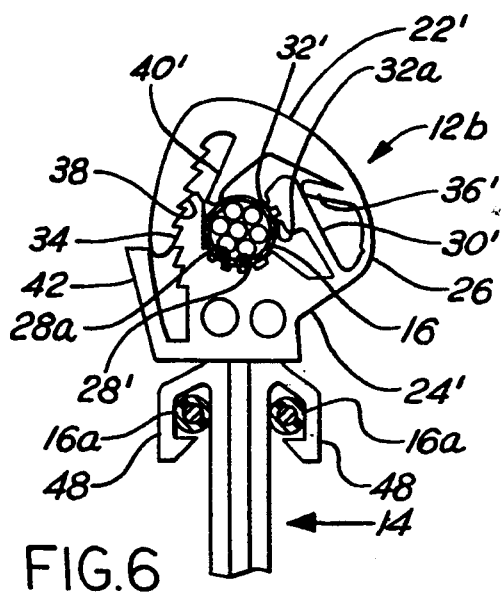
FIG. 6 is a partly sectional side view of a second preferred embodiment of the clip according to the present invention, shown in operation with respect to wiring, auxiliary wiring and a base structure.

Referring now to FIG. 1, the general configuration of the clip 10 according to the present invention is illustrated. In this regard, the clip 10 depicted is composed of a first preferred head 12a and a stanchion 14 that is connected with the head 12a. The head 12a is structured to releasably hold wiring 16, which may or may not be a wiring harness, with respect thereto and the stanchion 14 is structured to be received in an aperture 18 in a base structure 20. The head 12a is structured to securely hold the wiring 16, yet selectively release the wiring in a nondestructive manner, whereby the head is completely reusable. Preferably, the head 12a and the stanchion 14 are formed of a single piece of durable plastic material.

As can be understood by reference to FIGS. 1 through 5, the head 12a is provided with an upper portion 22 and a lower portion 24, wherein the lower portion is connected with the stanchion 14 and the upper and lower portions are mutually connected by a living hinge 26. Each of the upper and lower portions 22, 24 approximate, loosely, a semi-circle so that, when the head 12a is in the closed configuration shown in FIG. 3, the wiring is encompassed thereby.

The lower portion 24 of the head is provided with a wiring seat 28 having a concave shape for restably receiving thereupon the wiring 16. Between the wiring seat 28 and the living hinge 26, the lower portion 24 is provided with a flexible retention arm 30. The flexible retention arm 30 terminates in a preferably concavely shaped wiring contact portion 32. On the side of the wiring seat 28 opposite the retention arm 30, the lower portion 24 is provided with a first toothed surface member 34 which is oriented substantially parallel with respect to the stanchion 14, and having teeth 34a facing away from the wiring seat.

The upper portion 22 of the head is provided with a flexible biasing arm 36 located more or less near the living hinge 26. The upper portion 22 is provided with a second toothed surface member 38 acutely angled with respect to the upper portion so as to align ably engage with the first toothed surface member 34; the second toothed surface member having teeth 38a facing toward the wiring seat 28. Between the biasing arm 36 and the second toothed surface member 38, the upper portion 22 is provided with a flexible abutment arm 40.

The aforementioned structural components are dimensioned to mutually cooperate in order to securely hold the wiring 16 with respect to the head 12a. In this regard, the upper portion 22 is pivoted on the living hinge 26 away from the lower portion 24 to allow the wiring 16 to be placed upon the wiring seat 28. The upper portion 22 is thereupon pivoted on the living hinge 26 toward the lower portion 24. During this movement, the first and second toothed surface members 34, 38 will mutually engage in a gearing, ratchet-like manner, while the wiring contact portion 32 of the retention arm 30 is pressed against the wiring 16 by action of the biasing arm 36 pressing thereagainst. In this regard, the teeth of the toothed surface members 34, 38 each have a leading edge that is mutually slanted in a ramped saw-tooth fashion so that the teeth 34a, 38a of the first and second toothed surface members slip over each other during engagement (wherein the upper portion pivots toward the lower portion); and, further, the teeth each have a trailing edge that is substantially mutually parallel to thereby gearably interlock and prevent disengagement of the first and second toothed surface members. Preferably, the first and second toothed surface members 34, 38 have a gentle reciprocable curvature for facilitating their mutual engagement as the upper portion 22 pivots on the living hinge 26. Depending on the diameter of the wiring 16, the abutment arm 40 may engage the wiring 16, as shown in FIG. 3, to thereby assist holding the wiring at the wiring seat 28. In this regard, the abutment arm 40 serves to prevent the wiring 16 from "popping-out" of the wiring seat 28 as the wiring contact surface 32 pressurably abuts the wiring. The final disposition of the upper portion 22 with respect to the lower portion 24 will secure the wiring 16 to the head 12a.

The living hinge 26 is in a relaxed state when the second toothed surface member 38 is not engaging the first toothed surface member 34, and resiliently deforms as the second toothed surface member gearably engages the first toothed surface member. Accordingly, the biasing provided by the resilient deformation of the living hinge 26 causes the first and second toothed surface members 34, 38 to be mutually gearably engaged. In order to ensure continued gearable engagement during operation, a retention arm 42 is provided on the lower portion 24 in spaced relation from the first toothed surface member 34 so that the second toothed surface member 38 is abuttingly trapped therebetween.

In order to nondestructively release the wiring 16 from the head 12a, the second toothed surface member 38 is transversely twisted so as to slide with respect to the first toothed surface member 34, as shown in FIG. 5. Twisting of the second toothed surface member 38 causes the second toothed surface member to slide out of engagement with the first toothed surface member 34 along either direction of arrow A, even though the retention arm 42 is present. When the first and second toothed surface members 34, 38 are mutually disengaged, the upper portion 22 may then be pivoted on the living hinge 26 away from the lower portion 24, and the wiring thereupon removed from the head 12a. Snappably interacting tabs may be added to either side of the first and second toothed surface members 34, 38 to prevent accidental disengagement therebetween.

The stanchion 14 is provided with a foot 44 for providing stable resting upon one side of the base structure 20. The stanchion 14 terminates in a pair of resilient wing tips 46 which are dimensioned to lockably engage with respect to the base structure 20 adjacent the aperture 18 at the other side thereof so that the foot 44 of the stanchion rests on the base structure firmly, without undue wobble. The stanchion 14 has a preselected length which is determined by the desired location of the wiring 16 with respect to the base structure 20.

The stanchion 14 is preferably provided with one or more (preferably an opposing pair) of auxiliary wiring holders 48. Each auxiliary wiring holder 48 preferably is in the form of an arm 48a terminating in a hook 48b angled toward the stanchion. Auxiliary wiring 16a is trapped between the stanchion, the arm 48a and the hook 48b. The arm 48a is sufficiently flexible to allow the arm to be deformed to permit the auxiliary wiring to be selectively placed into and removed from the auxiliary wiring holder 48.

Figure 7:
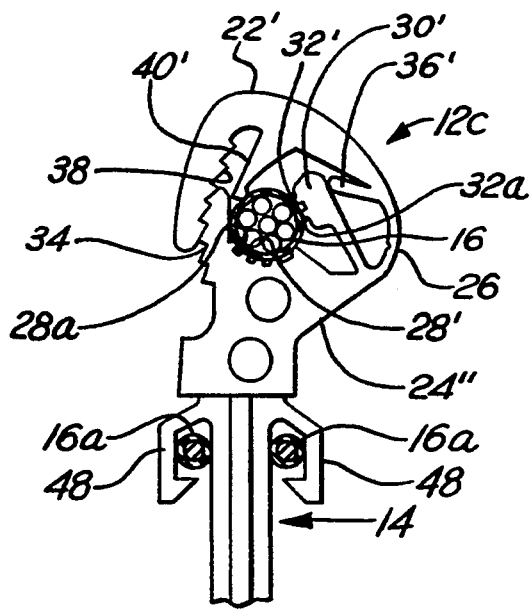
FIG. 7 is a partly sectional side view of a third preferred embodiment of the clip according to the present invention, shown in operation with respect to wiring, auxiliary wiring and a base structure.
Figure 8:
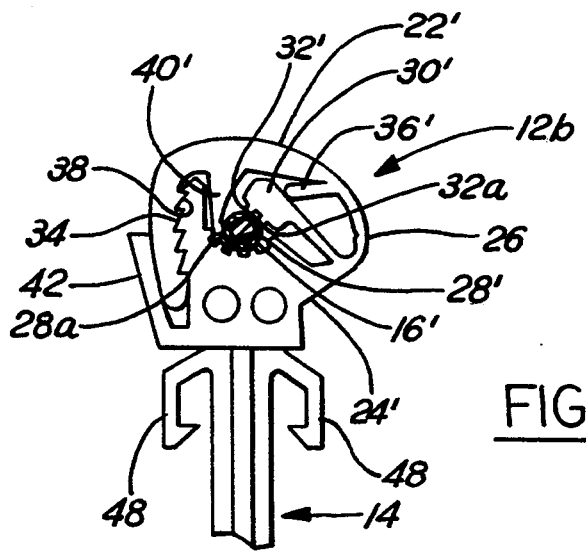
FIG. 8 is a partly sectional side view of the clip depicted in FIG. 6, now shown in operation with a smaller diameter wiring.

FIGS. 6 through 8 depict alternative heads 12b, 12c of the clip 10. In this regard all components having similar structure and function have similar numeral designations, with primes designating modified structures.

The head 12b depicted in FIG. 6 has a wiring seat 28' provided with a plurality of closely spaced notches 28a, and the wiring contact surface 32' of the retention arm 30', which is now shown as being optionally less concavely shaped and also provided with closely spaced notches 32a. The notches 28a, 32a engage with respect to the wiring 16 to thereby prevent the wiring from slipping with respect to the head 12b. The abutment arm 40' is now substantially inflexible and oriented to more directly engage with respect to the wiring 16; again, also tending to prevent slippage of the wiring 16 with respect to the head 12b. The structure of the head 12b depicted in FIG. 6 operates otherwise as recounted with respect to the first mentioned head 12a.

It should be noted that the first mentioned head 12a accommodates wiring slippage because it is provided with smooth surfaces on the wiring seat 28 and the wiring contact portion 32, and is provided with a flexible abutment arm which is mounted acutely with respect to the wiring seat, These structural features are important in environments where the wiring 16 may be subjected to slipping stresses wherein it is best to allow the wiring to slip, rather than the wiring or the stanchion fail. On the other hand, the second mentioned head 12b does not accommodate wiring slippage because the wiring seat 28' and the wiring contact portion 32' are provided with notches which are oriented transverse to the cylindrical axis of the wiring 16, and because the abutment arm 40' is substantially inflexible and mounted substantially radially with respect to the wiring seat. These structural features are important in environments where untoward slipping stresses are not expected.

The head 12c depicted in FIG. 7 is similar to that described with respect to FIG. 6, except now the retention arm is obviated and the lower portion 24″ is, consequently, of modified shape.

The head 12b depicted in FIG. 8 is operating with respect to a smaller cross-sectioned wiring 16' than that shown in FIG. 6. It will be noted that the second toothed surface member 38 is fully engaged with respect to the first toothed surface member 34 and the abutment member 40' is serving as an aid to locate the wiring with respect to the wiring seat 28'.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A clip for holding wiring at a predetermined location with respect to a base structure, said clip comprising:
   a head, said head comprising:
     a lower portion having a wiring seat of predetermined shape for restably receiving thereupon the wiring, said lower portion having a flexible retention arm located on a first side of said wiring seat, said flexible retention arm terminating in a wiring contact surface, said lower portion further having a first toothed surface member located opposite said first side of said wiring seat;
     an upper portion having a flexible biasing arm, said upper portion further having a second toothed surface member; and
     hinge means connected with said upper and lower portions for providing pivoting of said upper portion with respect to said lower portion; and
   means for connecting said head to the base structure to thereby locate said head at the predetermined location with respect to the base structure;
   wherein as said upper portion is pivoted toward said lower portion, said wiring contact surface of said flexible retention arm is flexed toward said wiring seat by said biasing arm abutting thereagainst due to pivoting of said upper portion with respect to said lower portion, said first and second toothed surface members mutually gearably engaging to thereby hold said upper portion at a selected pivotal location with respect to said lower portion.

2. The clip of claim 1, wherein each of said first and second toothed surface members are provided with teeth, each tooth of said teeth having a predetermined shape so that said teeth of said first and second toothed surface members slip over each other during mutual engagement and gearably interlock so as to prevent mutual disengagement; further wherein said hinge means further comprises biasing means for biasing said teeth mutually into said gearably interlocked relationship.

3. The clip of claim 2, further comprising an abutment arm located on said upper portion between said second toothed surface member and said biasing arm for selectively contacting the wiring when said upper portion is pivoted toward said lower portion to thereby assist holding the wiring restably against said wiring seat.

4. The clip of claim 3, further comprising a retainer arm connected with said lower portion in a predetermined spaced relation with respect to said first toothed surface member so that said second toothed surface member is abuttably trapped between said retainer arm and said first toothed surface member when said upper portion is pivoted toward said lower portion; wherein said second toothed surface member is twistable with respect to said upper portion so as to be transversely slid with respect to said first toothed surface member and thereby be gearably disengaged from said second toothed surface member.

5. The clip of claim 4, wherein said connection means comprises a stanchion connected with said lower portion, said stanchion terminating in means for interconnecting with respect to an aperture of the base structure to thereby hold said stanchion in a fixed orientation with respect to the base structure.

6. The clip of claim 5, further comprising auxiliary wiring holder means connected with at least one of said stanchion and said lower portion for selectively holding auxiliary wiring with respect to said clip.

7. The clip of claim 6, wherein said abutment arm is flexible with respect to said upper portion, further wherein said abutment arm is oriented substantially acutely with respect to said wiring seat.

8. The clip of claim 6, wherein said abutment arm is substantially inflexible with respect to said upper portion, said abutment arm being oriented substantially radially with respect to said wiring seat.

9. The clip of claim 8, where the wiring has a cylindrical axis, wherein further said wiring seat and said wiring contact surface are provided with notches oriented transverse to the cylindrical axis of the wiring.

10. A clip for holding wiring at a predetermined location with respect to a base structure, said clip comprising:

a head, said head comprising:

a lower portion having a wiring seat of concave shape for restably receiving thereupon the wiring, said lower portion having a flexible retention arm located on a first side of said wiring seat, said flexible retention arm terminating in a wiring contact surface, said lower portion further having a first toothed surface member located opposite said first side of said wiring seat;

an upper portion having a flexible biasing arm, said upper portion having a second toothed surface member, said upper portion further having an abutment arm located between said second toothed surface member and said flexible biasing arm;

a retainer arm connected with said lower portion in a predetermined spaced relation with respect to said first toothed surface member so that said second toothed surface member is abuttably trapped between said retainer arm and said first toothed surface member when said upper portion is pivoted toward said lower portion; and hinge means connected with said upper and lower portions for providing resiliently biased pivoting of said upper portion with respect to said lower portion; and means for connecting said head to the base structure to thereby locate said head at the predetermined location with respect to the base structure;

wherein as said upper portion is pivoted toward said lower portion, said wiring contact surface of said flexible retention arm is flexed toward said wiring seat to thereby hold the wiring against said wiring seat by said biasing arm abutting thereagainst due to pivoting of said upper portion with respect to said lower portion, said abutment arm selectively contacting the wiring when said upper portion is pivoted toward said lower portion to thereby assist holding the wiring restably against said wiring seat, said first and second toothed surface members mutually gearably engaging to thereby hold said upper portion at a selected pivotal location with respect to said lower portion;

wherein said second toothed surface member is twistable with respect to said upper portion so as to be transversely slid with respect to said first toothed surface member and thereby be gearably disengaged from said second toothed surface member: and wherein each of said first and second toothed surface members are provided with teeth, each tooth of said teeth having a predetermined shape so that said teeth of said first and second toothed surface members slip over each other during mutual engagement and gearably interlock so as to prevent mutual disengagement; further wherein said resiliently biased pivoting provides biasing of said teeth mutually into said gearably interlocked relationship.

* * * * *